UNITED STATES PATENT OFFICE.

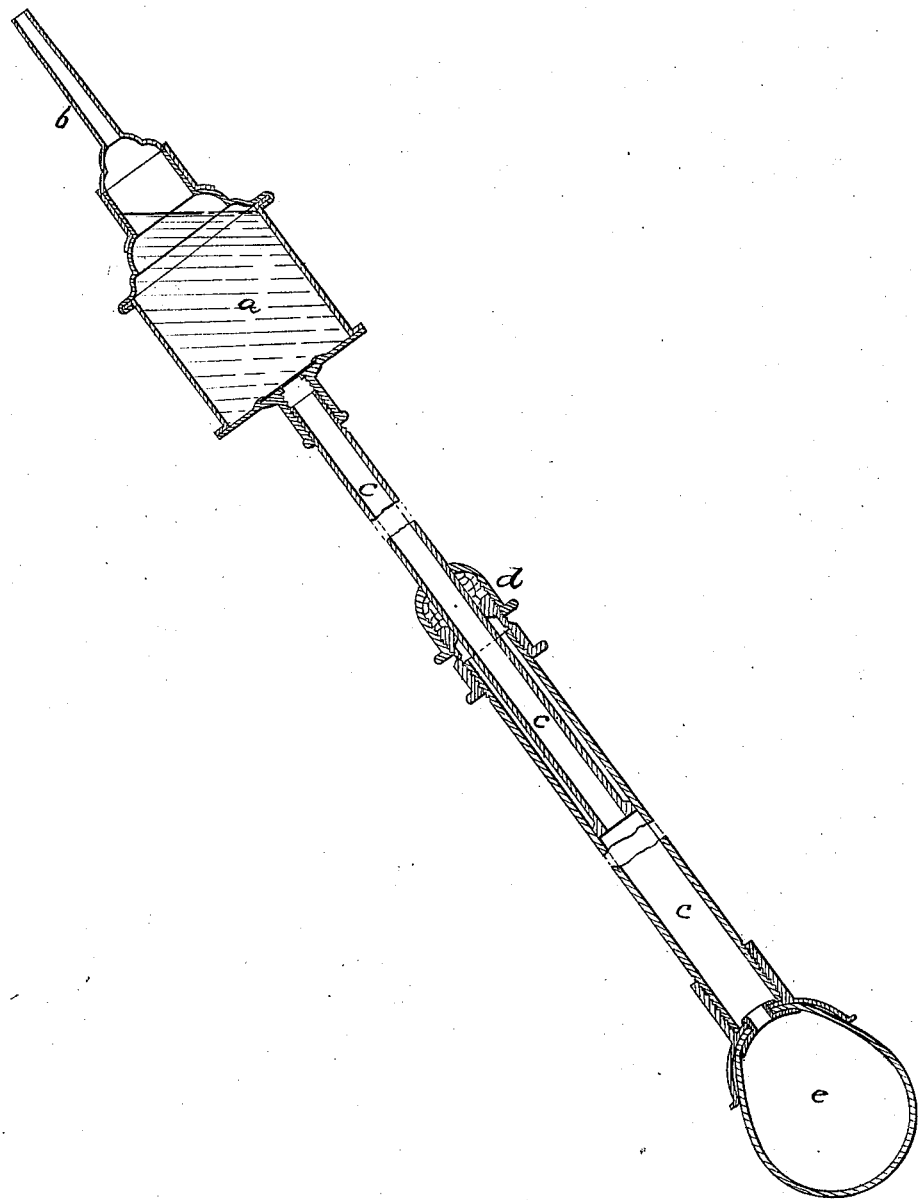

PETER REYNARD AND VICTOR VARIN, OF NEW YORK, N. Y.

IMPROVED DEVICE FOR DESTROYING INSECTS AND VERMIN.

Specification forming part of Letters Patent No. 44,341, dated September 20, 1864.

*To all whom it may concern:*

Be it known that we, PETER REYNARD and VICTOR VARIN, of the city and State of New York, have invented, made, and applied to use a certain new and useful Means for Destroying Insects and Vermin; and we do hereby declare the following to be a full, clear, and exact description of our said invention, reference being had to the annexed drawing, making part of this specification, wherein we have represented a longitudinal section of our said invention.

Our invention relates to a means for blowing powder among insects for the purpose of destroying them. Difficulty often exists in reaching the place in which such insects secrete themselves—for instance, around the water-pipes, that often are near the ceilings of kitchens, &c., or the insects upon trees and plants.

The nature of our invention consists in a hollow handle or pipe, extending from a blowing device—such as a compressible ball—to a vessel containing the powder to be blown upon the insects, whereby we are able get the powder close to the point of delivery while the blowing device is near the hand of the operator, thus avoiding as much as possible the weight of apparatus at the far end of the handle, and enabling the operator perfectly to control the action of the wind in blowing such powder out of the apparatus upon the insects or vermin.

In the drawing, $a$ is a receptacle of any desired size or shape, with a tube or conductor, $b$, at the end, through which the powder is blown by the wind that enters the receptacle $a$ from the tube $c$, and at this point is a piece of wire-gauze, to prevent the powder passing down said tube $c$.

The tube $c$ is represented as formed in two pieces, the one sliding withing the other with a packing at $d$, similar to an extension gas-fixture, so that the length of tube $c$ can be increased or lessened to accommodate the distance between the operator and the place to be reached by the powder, and $e$ is an india-rubber ball or bag secured to the end of $c$ by a hollow rivet or other convenient device. This ball forms the blowing device, which, on being grasped by the hand and squeezed, causes the air within to drive out a portion of the powder contained in $a$ in a manner similar to that set forth in our patent of November 8, 1859. It will be evident that this extension-pipe $c$ is a convenience, as it allows the operator to use the powder blower close to him or at a distance; but the same object may be attained of reaching a distance if the tube conveying the air is formed of a hollow reed, a grooved rod inclosed, or a rubber pipe sustained by a rod, in all instances the tube or air-conductor extending from the blowing device near the hand of the operator to the powder vessel at a distance.

It will be evident that this apparatus may be used for blowing powder of any different kind, and that the same may be used under any circumstances wherever available, whether for the destruction of insects and vermin or for any other object.

What we claim, and desire to secure by Letters Patent, is—

Connecting the blowing apparatus near the hand of the operator with the vessel containing the powder by means of a tube or air conductor, as and for the purposes specified.

Dated this 14th day of May, A. D. 1864.

P. REYNARD.
V. VARIN.

Witnesses:
LEMUEL W. SERRELL,
CHAS. H. SMITH.